Oct. 31, 1933.  G. SWALLOW  1,933,456
DUST GUARD
Filed Dec. 5, 1931
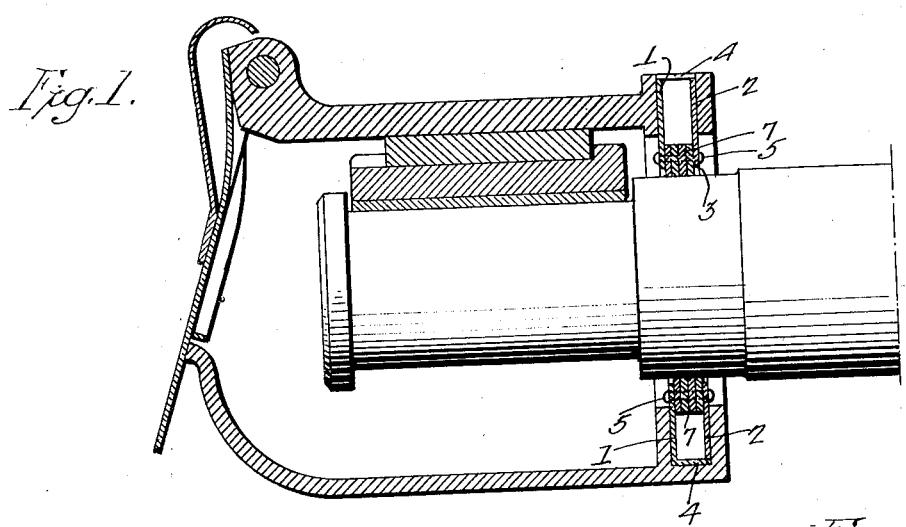
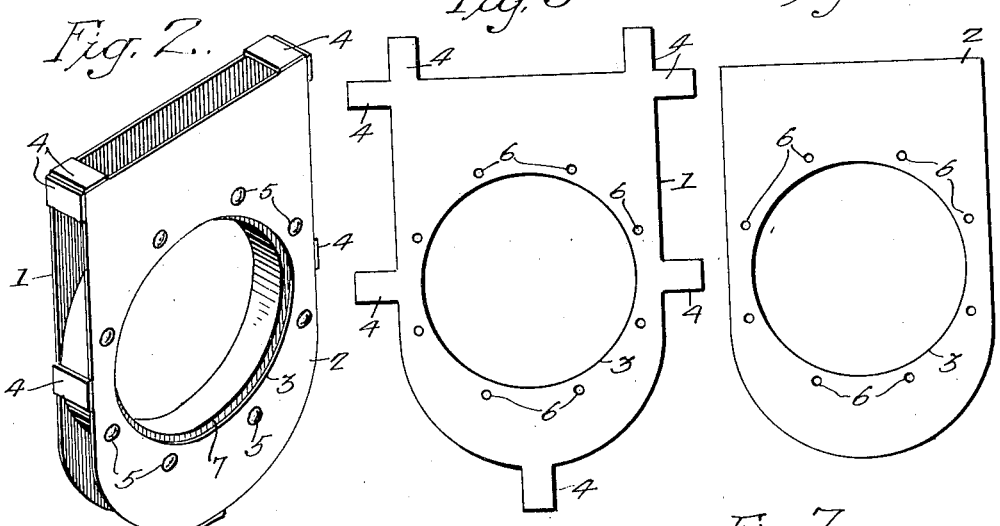
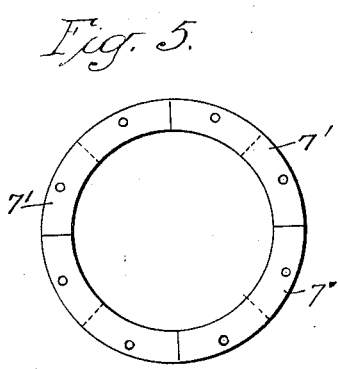
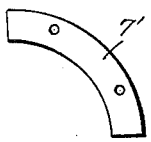
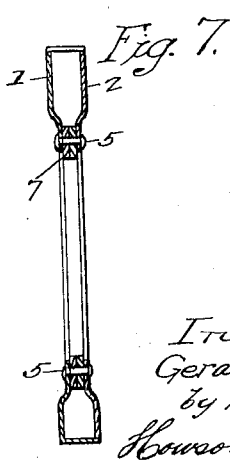
Inventor.
Gerald Swallow
by his Attorneys
Howson & Howson Patented Oct. 31, 1933

1,933,456

UNITED STATES PATENT OFFICE 1,933,456

DUST GUARD

Gerald Swallow, Norristown, Pa., assignor to Continental-Diamond Fibre Company, Newark, Del., a corporation of Delaware Application December 5, 1931. Serial No. 579,279

4 Claims. (Cl. 286—6)

This invention relates to improvements in dust guards for rotary shaft bearings with particular reference to journal boxes for railroad rolling stock, and the principal object of the invention is to provide a structure which can be manufactured more economically than those of prior art and still be strong and durable. It is an improvement over the dust guard described in my co-pending application, Serial No. 275,357, filed May 5, 1928, now Patent No. 1,874,382, patented Aug. 30, 1932.

Other objects of the invention are to provide a dust guard which shall be impervious to oil and grease, shall not fracture in use, which shall have flexibility sufficient to render it self-adjustable to the movement of the rotary shaft or journal members, and which shall form a snug fit with the shaft or axle and shall maintain such fit during extended periods of operation.

Another object is to provide a dust guard in which the guard material is in the form of a collar or ring which is held firmly in place by riveting it to the walls of the casing thereby preventing any slipping or derangement of the material.

Still another object of the invention is to construct the guard collar of rigid fibrous material with an aperture therein to receive the rotary shaft or axle. In making the guard, waste material or pieces of scrap may be utilized to good advantage, thereby reducing the cost of manufacture.

The guard is adapted to be used with any rotary shaft or bearing where the journal or bearing is to be protected from grit and dirt and where the lubricant is to be kept from being forced out from the parts to be lubricated.

In my preferred embodiment of the invention, I have illustrated a journal box for railroad cars in the drawing of which:

Figure 1 is a sectional view of a journal box with a dust guard of my invention fitted into place;

Figure 2 is a perspective view of the guard;

Figures 3 and 4 are views of the back and front plates of the guard;

Figures 5 and 6 are views of a preferred structure of the guard collar or ring; and Figure 7 is a modification of the invention.

Figure 2 shows the assembled guard in which 1 and 2 are the back and front plates respectively which are held in parallel spaced relation by welding plate 2 to the lugs 4 which are an integral part of plate 1.

It has been found that rigid fibrous material, such as impregnated fibre or vulcanized fibre, is particularly well adapted for dust guard purposes. The dust guard may be formed either as a solid collar or ring or may be composed of physically separable laminated segments; the latter is to be preferred since very desirable features are obtained. If impregnated fibre is used, it may take the form of paper or cloth sheets or macerated or scrap fabric impregnated with synthetic resin such as the phenolic type in its final or insoluble stage, and may be formed into a solid ring or into segments for use in the preferred form of ring which is composed of physically separable laminated segments. Fibrous materials of the type contemplated, when placed in layers to form a laminated body of desired thickness, are substantially impervious to oil and grease, and their physical characteristics are such that they will not split or fracture very readily under normal operating conditions. Such fibrous materials are also subject to very slight frictional wear, and a close fit between the guard and the rotary shaft or axle journal will accordingly be maintained over long periods of use. By using a laminated ring structure of physically separable laminae rather than a solid ring, greater strength and rigidity is obtained. The laminations oppose movement of each other and thus the entire structure is strengthened and rigidified.

Between the plates 1 and 2 is inserted or clamped the guard material 7. The guard material is in the form of a collar or ring preferably comprising physically separable laminated segments 7', as shown in Figures 5 and 6, and preferably made of vulcanized fibre although other fibrous materials may be employed as hereinbefore described and a solid ring may be used if desired. In the preferred form, the segments are placed in layers in such a manner that the segments of one layer are in staggered relation with the segments of the succeeding or adjacent layer, thereby making the collar or ring stronger and more rigid. This staggered relation of the segments makes the guard conform to the surface of the shaft more readily and engages it more snugly over extended periods of use thereby excluding dust and gritty material from the rotary shaft bearing or journal box more completely.

The assembled layers of the segments are held firmly in place by means of the rivets 5 which pass through the plates 1 and 2, through the segments through the holes 6, thereby firmly compressing the layers and preventing their becoming deranged from the staggered relation.

The guard collar 7 extends slightly outside and slightly inside the circumference of the apertures 3 in the plates 1 and 2. The portion extending outside the apertures provides the portion through which the rivets 5 pass while the inside portion engages the rotary shaft or journal.

The plates 1 and 2 shown in Figures 3 and 4 are made of sheet metal stampings; each plate is stamped out in one operation.

The back plate 1 is provided with lugs or "ears" which are an integral part of the plate and which are bent at right angles thereto to receive the front plate 2. Lugs are used instead of flanges running the length of the plate in order to reduce the quantity of metal.

The plate 2 is similar to plate 1 except that it is not provided with lugs although it is within the scope of the invention to do so. The plate 2 is disposed in parallel spaced relation with plate 1 by welding it to the lugs 4 with the rivet holes 6 and the shaft apertures 3 in perfect alignment.

A dust guard of the type illustrated and described, while having the required strength, still possesses sufficient flexibility as a unit to permit it to adjust itself readily to the relative movements between the rotary shaft and bearing or axle and journal box and, therefore, it is not subject to adverse strains to the same extent as an entirely rigid guard. In other words, the supporting plates are movable to an extent sufficient to allow movement of the device with lateral movement of the shaft.

Obviously, there may be considerable modification in the form of the dust guard without departure from the invention. One such modification is shown in Figure 7 in which the cross-section of the assembled unit is reduced at the apertures through which the shaft passes. The advantage of this reduction of cross-section is that fewer laminæ of the material 7 are required to form the collar and still maintain the efficiency of the guard in keeping grit and other foreign material out of the bearing or journal box.

There may be still other modifications without departure from the invention.

Although my preferred embodiment of the invention has particular reference to the use of the dust guard of my invention in journal boxes of railroad rolling stock, I do not wish to be limited thereby but rather by the scope of the appended claims.

I claim:

1. As an article of manufacture, a dust guard for journal boxes or railroad rolling stock comprising a pair of similarly shaped plates of sheet metal stamping disposed in parallel relation with apertures therein, said apertures being in axial alignment to receive an axle journal, means for holding said plates in spaced relation comprising lugs disposed at right angles to said plates, said lugs being an integral part of one of said plates and the extreme edges of said lugs welded to the other of said plates, a collar or ring of rigid fibrous material which is impervious to oil and grease disposed between said plates and in axial alignment with the apertures of said plates, and means comprising rivets for holding said collar firmly in place between said plates.

2. As an article of manufacture, a device of the class described comprising a pair of plates disposed in parallel relation with apertures therein to receive an axle journal, means for holding said plates in spaced relation, a collar disposed between said plates and in axial alignment with the apertures of said plates, said collar comprising a plurality of layers of thin rigid fibrous material, each layer comprising a plurality of segments of said material, the segments of adjacent layers being arranged in staggered relation, and means for holding said segments firmly together and in place between said plates.

3. A dust guard for journals of railroad rolling stock comprising a pair of plates of sheet metal stamping disposed in parallel relation with apertures therein to receive a shaft, means for holding said plates in spaced relation comprising lugs at right angles to said plates, said lugs being an integral part of one of said plates and the extreme edges of said lugs welded to the other of said plates to form a casing, a collar disposed between said plates and in axial alignment with the apertures of said plates, said collar comprising a plurality of layers of fibrous material each layer comprising a plurality of segments, the segments of adjacent layers being arranged in staggered relation, and means comprising rivets extending from one plate through the segments and the other plate to hold said collar firmly in place between said plates and to prevent derangement of said segments.

4. As an article of manufacture, a device of the class described comprising a pair of plates disposed in parallel relation with apertures therein to receive an axle journal, means for holding said plates in spaced relation, a collar disposed between said plates and in axial alignment with the apertures of said plates, said collar comprising a plurality of layers of thin rigid fibrous material, each layer comprising a plurality of segments of said material, and means for holding said segments firmly together and in place between said plates.

GERALD SWALLOW.